United States Patent
Matsushita et al.

(10) Patent No.: US 7,154,576 B2
(45) Date of Patent: Dec. 26, 2006

(54) LCD REFLECTOR WITH REPETITION PITCH

(75) Inventors: Tomohiko Matsushita, Kadoma (JP); Shigeru Aoyama, Soraku (JP); Makoto Ohhira, Nara (JP); Motohiko Matsushita, Nara (JP); Yasuhiro Kawabata, Nara (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/789,394

(22) Filed: Feb. 27, 2004

(65) Prior Publication Data

US 2004/0183966 A1    Sep. 23, 2004

(30) Foreign Application Priority Data

Feb. 28, 2003    (JP)    ............................. 2003-054826

(51) Int. Cl.
*G02F 1/1335*    (2006.01)

(52) U.S. Cl. ...................................... 349/113

(58) Field of Classification Search ........ 349/113–114, 349/69
See application file for complete search history.

(56) References Cited

U.S. PATENT DOCUMENTS

| | | | |
|---|---|---|---|
| 6,528,572 B1 * | 3/2003 | Patel et al. .................. | 524/495 |
| 6,568,819 B1 * | 5/2003 | Yamazaki et al. .......... | 362/619 |
| 2003/0016323 A1 * | 1/2003 | Ikeda et al. ................. | 349/113 |
| 2003/0103178 A1 | 6/2003 | Sakamoto et al. .......... | 349/113 |

* cited by examiner

*Primary Examiner*—Dung T. Nguyen
*Assistant Examiner*—Phu Vu
(74) *Attorney, Agent, or Firm*—Osha Liang LLP

(57) ABSTRACT

A reflector used for a display device has a plurality of unit reflecting portions. The unit reflecting portions are arranged by repeating arrangement patterns of unit regions. The unit regions have a repetition pitch that is integral times the pitch of pixels of a liquid crystal display and more than 5000 μm. More preferably, the repetition pitch of unit regions is integral times the pitch of pixels of a liquid crystal display and more than 10000 μm.

6 Claims, 5 Drawing Sheets

LCD REFLECTOR WITH REPETITION PITCH

BACKGROUND OF THE INVENTION

1. Field of the Invention

This invention relates generally to display devices and, more particularly, to a reflector used for a liquid-crystal display device.

2. Description of the Related Art

The reflective liquid-crystal display device, using a reflector for reflecting external light needs no backlight and advantageously reduce power consumption. The general reflective liquid-crystal display device has a liquid-crystal layer between the upper and lower substrates and a reflector on the upper or lower side of the lower substrate. The reflector has a plurality of unit reflecting portions that are concaves/convexes thereon to reflect and diffuse incident light.

The unit reflecting portions on the reflector are usually formed by photolithography. If the entire surface of a reflector is fabricated by one mask, huge data is required, which is costly. Accordingly, it is preferred to divide the surface of reflector into unit regions each of which has a certain arrangement of unit reflecting portions and repeatedly exposure, thereby fabricates one reflector.

By the way, in an attempt to randomly arrange unit reflecting portions, or concaves/convexes, within the unit region of the reflector, it is possible that concaves/convexes are not formed in some area (missing area). In case such a unit region having a missing area is arranged repeatedly, a line connecting the missing areas positioned with intervals is observed as a dark line by the viewer who sees the entire reflecting plate It is also possible that convexes/concaves with little undulations are formed in some area (almost flat area) within the unit region. In case such a unit region having an almost flat area is arranged repeatedly, a line connecting the flat areas positioned with intervals is observed as a bright line by the viewer who sees the entire reflecting plate.

Furthermore, some convex/concave with certain shapes may differentiate the lightness observed in the different directions, thereby cause contrast, and some fringe-like pattern is observed. Such bright and dark pattern of the reflector deteriorates the quality of display when it is superposed on a display device.

SUMMARY OF THE INVENTION

A reflector according to the present invention, in one aspect, includes: a plurality of unit reflecting portions; the unit reflecting portions being arranged by repeating an arrangement pattern of a unit region; wherein a repetition pitch of the unit regions is integral times the pitch of pixels of a liquid crystal display device and more than 5000 μm.

A reflector according to the present invention, in another aspect, includes: a plurality of unit reflecting portions; the unit reflecting portions being arranged by repeating an arrangement pattern of a unit region; wherein a repetition pitch of the unit regions is integral times the pitch of pixels of a liquid crystal and more than 10000 μm.

DETAILED DESCRIPTION OF THE INVENTION

Preferred embodiments of the present invention will be described with reference to the drawings. The dimensions, materials, shape, and the relative positions of components described in the embodiments, unless specifically described otherwise, are exemplified and not intended to limit the scope of the invention.

First Embodiment

Figure 1:
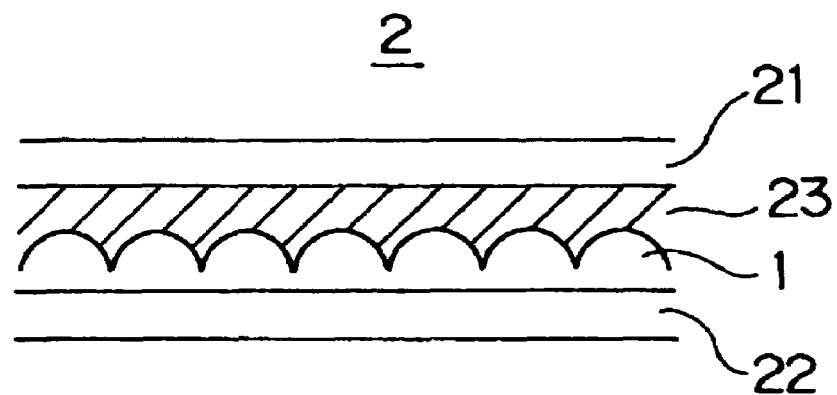
FIG. 1 is a sectional view showing the principle structure of a liquid-crystal display device.

FIG. 1 is a sectional view showing the major construction of a liquid-crystal display device employing a reflector 1 according to the invention. A liquid-crystal display device 2 has a liquid-crystal layer 23 between an upper substrate 21 and a lower substrate 22. The reflector 1 is integrally formed on the side of the liquid-crystal of the lower substrate 22. External light enters the upper substrate 21 and then reflected by the reflector 1 to exit to the outside through the upper substrate 21. By modulating the incident/exit light with the liquid-crystal layer, characters or images for example can be displayed.

Figure 2:
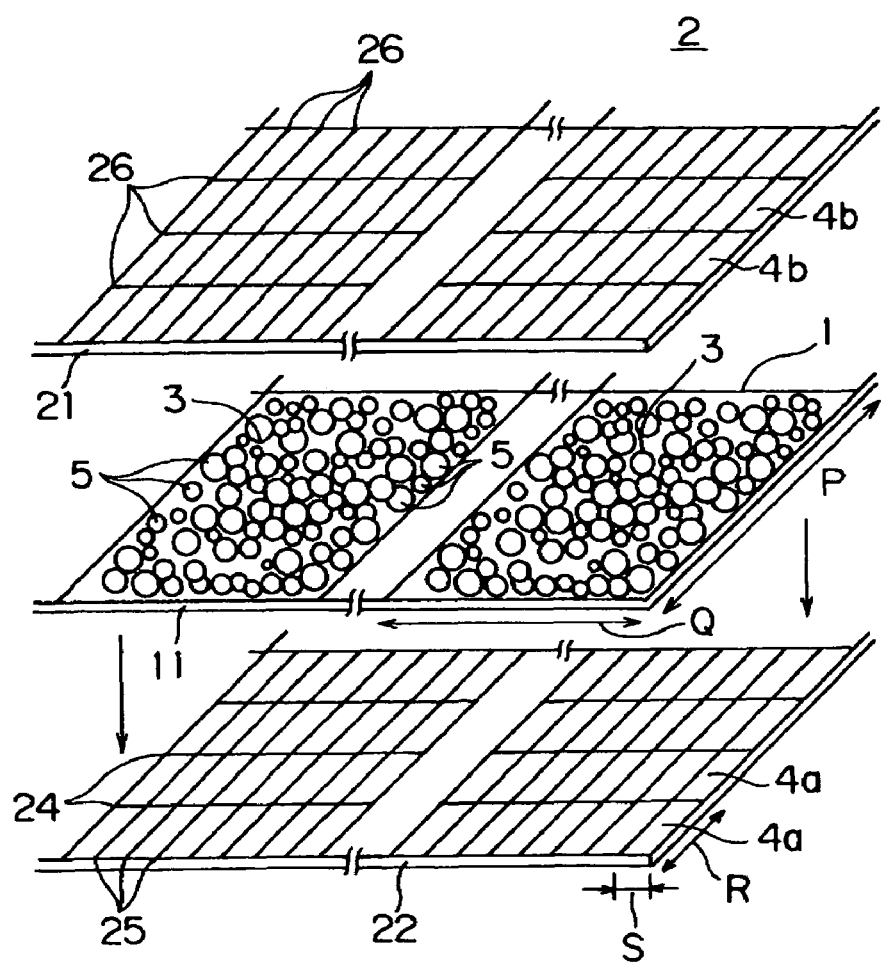
FIG. 2 is a perspective view showing a part of the liquid-crystal display device of FIG. 1.

FIG. 2 is a perspective view showing a part of the liquid-crystal display device of FIG. 1. The reflector 1 has a plurality of unit reflecting portions 5 on the surface of a base member 11. The base member 11 is formed on the upper surface of the lower substrate 22, but is shown with space in the figure for explanation. The reflector 1 is formed by repeatedly arranged unit regions 3. Each unit region 3 has the same arrangement pattern of unit reflecting portions 5. Meanwhile, the unit reflecting portions 5 are random in size. The unit region 3 is representatively rectangular in shape.

The lower substrate 22 has, on its surface, gate lines 24 formed in parallel with the horizontal direction of the figure and source lines 25 in parallel with the vertical direction. Individual regions 4a, divided by the gate lines 24 and source lines 25 on the lower substrate 22, provide pixels for the liquid-crystal display device 2.

The upper substrate 21 is formed with a black matrix 26 extending lengthwise and widthwise. Individual regions 4b, divided by the black matrix 26 on the upper substrate 21, provide pixels for the liquid-crystal display device. The pixels 4a of the lower substrate and the pixels 4b of the upper substrate, cooperatively, serve for display. These are equal in size and layered to superpose one pixel over another.

The unit region 3 of the reflector 1 has a repetition pitch that is usually more than 5000 μm, preferably more than 10000 μm, which is integral times of the repetition pitch of pixels 4. Namely, provided that the unit region 3 has a longer side P and a shorter side Q while the pixel 4 has a longer side R and a shorter side S, the shorter side Q is more than 5000 μm, preferably more than 10000 μm and further the longer side P is integral times of the longer side R and the shorter side Q is integral times of the shorter side S.

Now, consideration is made on the lightness/darkness change appeared due to the repetition of the unit regions 3, from the viewpoint of contrast sensitivity. Contrast sensitivity refers to the ability to detect whether or not there is a particular subject at the minimum contrast. Contrast sensitivity, quantitatively, can be defined as a reciprocal of the minimum contrast capable of perceiving a certain subject (contrast threshold). The lower is contrast the subject to be recognized, the higher is the contrast sensitivity. It is known that, where a standstill subject is viewed under a certain condition, the sensitivity against contrast varies depending upon the shape and size of the subject.

Accordingly, it is a usual to use, as a subject, a fringe whose lightness changes in the form of a sinusoidal wave and measure contrast sensitivity for each thickness of the fringe (spatial frequency). The manner (characteristics) of change of contrast sensitivity against a thickness of sinusoidal-wave fringe (spatial frequency: represented based on the number of fringes per degree: unit cycle/degree) is referred to as spatial frequency characteristics (contrast sensitivity function). By examining spatial frequency characteristics, it is possible to know a contrast required to detect a certain size of fringe, and also to know what degree of size of a fringe can be detected at a certain contrast.

On the supposition that the lightness/darkness pattern caused by the repetition of unit regions on the reflector is a fringe, contrast sensitivity was measured when the reflector is viewed from 300 mm above. 300 mm is a representative distance that people usually observes a display panel.

Supposing the unit region is square, reflectors each of whose side is 10200 μm, 5100 μm, 1020 μm, 510 μm or 255 μm were fabricated. Two reflectors for each size, totally ten reflectors were obtained. Each reflector is supposed to have a lightness/darkness fringe with a spatial frequency of 0.51, 1.03, 5.13, 10.27 or 20.53 (unit: cycle/degree).

For the first five reflectors, an averaged distance between the unit reflecting portions is 20 μm and a numerical aperture of the unit reflecting portion is 0.38. For the second five reflectors, an averaged distance between the unit reflecting portions is 10 μm and a numerical aperture of the unit reflecting portion is 0.38. The unit reflecting portion having a numerical aperture of 0.38 is to reflect the light entering in a direction of normal line of the reflector toward a range of field-of-view as mentioned before. The detail about the numerical aperture is described later.

Light with different intensities was radiated to the reflector at an incident angle of 30 degrees to the perpendicular line of the reflector. The lightness/darkness fringe on the reflector was observed 300 mm away from the reflector perpendicularly.

Figure 3:
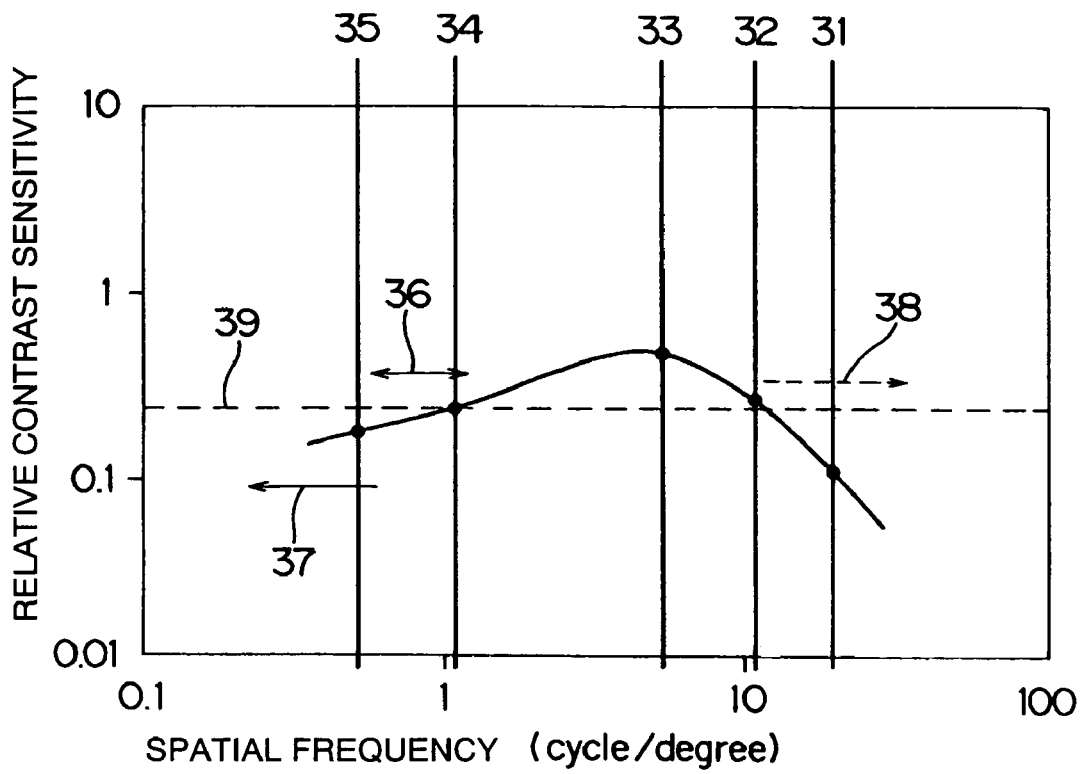
FIG. 3 is a graph showing an experimental result of relative contrast sensitivity.

FIG. 3 is a graph showing the result of an experiment. The horizontal axis shows a spatial frequency (unit: cycle/degree) on the unit region while the vertical axis shows relative contrast sensitivity. The references 31–35 in the figure are for reflectors each of whose side is 255 μm, 510 μm, 1020 μm, 5100 μm, or 10200 μm, respectively.

Generally, the relationship between spatial frequency and relative contrast sensitivity varies depending upon the characteristics of subject and surrounding environment. In FIG. 3, at high contrast, a lowering of sensitivity is comparatively small in the low spatial-frequency region. This is similar to a graph showing a feature of visual-system information processing. Namely, a spatial frequency of the reflector is characteristic in that relative contrast sensitivity attains the maximum at around 4 cycles/degree. In higher frequency region than this, relative contrast sensitivity falls abruptly. Meanwhile, in lower frequency region than that, relative contrast sensitivity decreases gradually.

Meanwhile, in the liquid-crystal display device, incident light is reflected and absorbed by the upper substrate, liquid-crystal layer and the like, and this delimit the amount of light reaching the reflector. Deducing from the experimental result, the relative contrast sensitivity corresponding to that light amount was approximately 0.21 (shown by broken line 39).

It can be understood from the graph that the spatial frequency should be not more than 1 (more than 5000 μm in cell spacing) (regions shown with arrows 36 and 37) or more than 10 (not more than 510 μm in cell spacing) (region shown with arrow 38) in order not to observe a fringe on the reflector.

Meanwhile, considering fabrication and processing of the reflector, the unit reflecting portion, or the convex/concave, must be larger than a certain size. Therefore, the variance of the distance between convexes/concaves is small within a small unit region, which increases the possibility that the light reflected by the convex/concave interfere with each other to cause a rainbow coloring. For this reason, the region having a small repetition pitch of unit regions shown with an arrow 38 in the graph is excluded from the preferred spatial frequency region.

Furthermore, another experiment was done while inclining the reflector differently and varying the observation position. Some people perceived fringe and some people didn't within their field of view. The reflectors used in the experiment were fabricated to diffuse reflected light into a field-of view. Because of this, the lightness/darkness of fringe tends to be emphasized. Accordingly, the lightness/darkness pattern can be visually perceived within a field-of-view even if a spatial frequency is comparatively high (with a fine fringe). It can be considered that such a tendency is reflected upon the experimental result.

From the above result, it has been revealed that the cell pitch is preferably more than 5000 μm, more preferably more than 10000 μm.

Meanwhile, it is known that moiré appears on the liquid-crystal display screen where the repetition pitch of unit regions is not integral times of the pitch of pixels. In order to suppress moiré in the invention, the repetition pitch of unit regions is integral times of the pitch of pixels.

The pixel and the unit region are not limited to rectangular in shape. About the unit region, it is possible to desirably select a form suited for fabricating a reflector. Note that the pixel refers to each one point of RGB.

Each of the length and the width of the unit region may be integral times the length and the width of the pixel equally or respectively. For example, the longer side P of the unit region may be 20 times the longer side R of the pixel, while the shorter side Q of the unit region be 20 times the shorter side S of the pixel. Otherwise, the longer side P of the unit region may be 20 times the longer side R of the pixel, while the shorter side Q of the unit region be 30 times the shorter side S of the pixel.

The reflector and the liquid crystal display device are stacked so that each of the sides of the unit regions is aligned with one or more sides of pixels.

The unit reflecting portions may be convex or concave in form. Meanwhile, the unit reflecting portions may be in a spherical form to diffuse incident luminous flux in every direction or in a non-spherical form to reflect incident luminous flux in a given direction.

Second Embodiment

In this embodiment, one of the unit reflecting portions provided on the reflector is considered.

The human eye's resolving power relies upon his/her eyesight, which can be expressed as:

eyesight=1/the angle covering the subject (minutes).

In case eyesight is 1, it is possible to resolve and visually perceive an angle difference of 1 minute.

Figure 4:
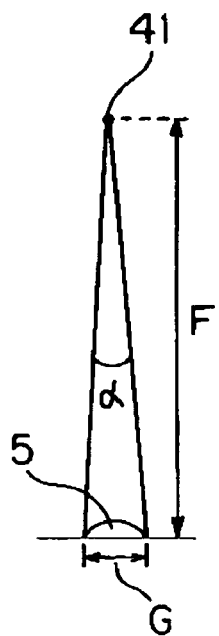
FIG. 4 is an explanatory figure showing the relationship between a size of a unit reflecting portion and a resolving power of the eye.

FIG. 4 shows the relationship between the size of the unit reflecting portion and a resolving power of the eye. G is a diameter of a circumscribed circle of a positive projection of the unit reflecting portion 5 onto the reflector (reflecting portion diameter), a point 41 is a view point, F is a distance between the view point 41 and the unit reflecting portion 5, α is an angle covering diametrical opposite ends of the reflecting portion.

Assuming that human's average eyesight is 1, and the distance F is 300 mm, the visually-perceivable distance G between the opposite ends of the unit reflecting portion 5 is given as:

$G/(300\times1000)=\tan(1/60)$, where $G \approx 80$ μm.

Accordingly, unit reflecting portions whose reflecting portion diameter is less than 80 μm can hardly be visually perceived.

Third Embodiment

In this embodiment, variation in size of convexes/concaves is considered. It is known that equally sized convexes/concaves cause interference, thereby cause rainbow coloring on the reflector. In order to avoid this, the convexes/concaves are provided with variations size.

Convex/concave whose diameter is not less than 80 μm can inconveniently be perceived as a bright point as mentioned above. Convex/concave whose diameter is less than 5 μm is difficult to be fabricated. Furthermore, in case convexes/concaves whose diameter is less than 5 μm are concentrated at one place, a dark point is perceived on the reflection surface.

Figure 5:
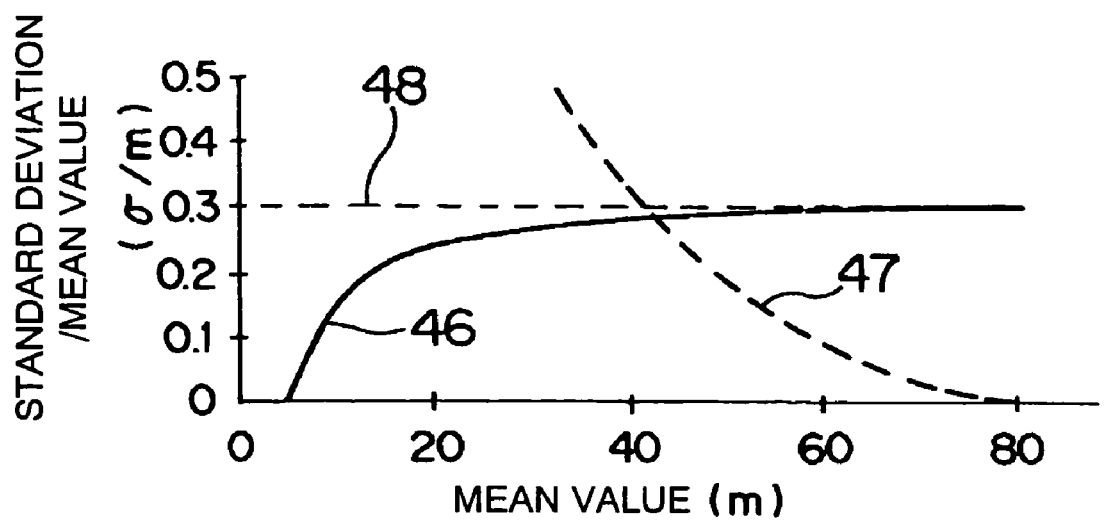
FIG. 5 is a graph showing the relationship between a variation in reflecting portion diameters and a mean value of reflecting portion diameters.

FIG. 5 is a graph showing the relationship between a diameter variation in the reflecting portions and an average diameter of the reflecting portions. The horizontal axis of graph shows a mean value (m) of diameters of reflecting portions while the vertical axis shows a value the standard deviation (σ) of reflecting portion diameters divided by m. The graph shows a result of a trial computation made for varying diameters in the reflecting portion supposing that convex/concave has a circular bottom surface. The line 46 shows a boundary defining a variation state where the convex/concave exceeding a diameter 5 μm is not fallen. The line 47 shows a boundary defining a variation state where the convex/concave exceeding a diameter 80 μm is not fallen.

From this graph, it can be read that, in case the value σ/m is not more than 0.3 (shown with broken line 48), the reflecting portion diameter can be randomly varied within a range more than 5 μm and a range not more than 80 μm.

Fourth Embodiment

A reflector having unit reflecting portions defined to collect light in a given direction has an ineffective portion. In this embodiment, pattern that caused by the ineffective portion is considered. FIG. 6 shows a part of such a reflector.

Figure 6A:
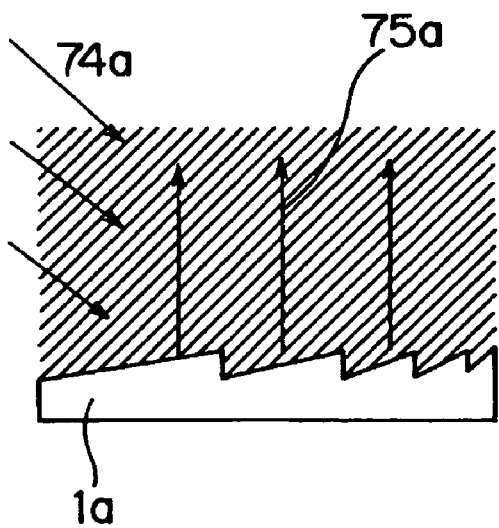
FIGS. 6A and 6B are explanatory views of a reflector having unit reflecting portions configured to collect light in a certain direction.

A reflector 1a shown in FIG. 6A is an ideal reflector. An incident luminous flux 74a entered the reflector 1a turns into a reflection light 75a traveling in a given direction. In case the ideal reflector 1a is viewed in a direction the reflection light 75a travels (at immediately above), the light portions from all the convexes/concaves are viewed. No lightness/darkness patterns appear on the screen of the display plate.

Figure 6B:
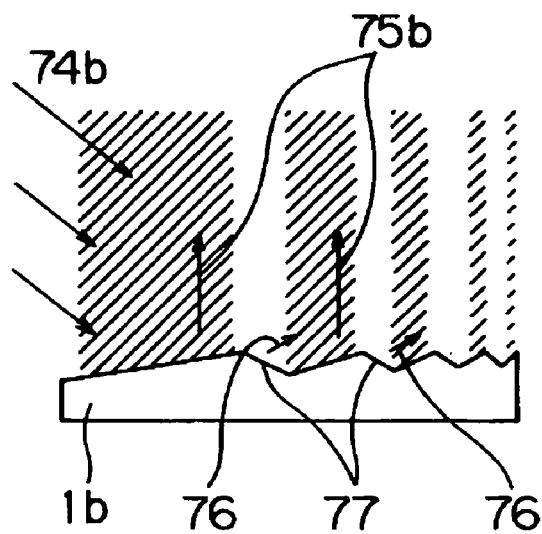

However, the convex/concave cannot be fabricated perfectly in vertical direction at its end for lack of accuracy. A reflector 1b shown in FIG. 6B is an actual reflector. An incident luminous flux 74b, entered the actual reflector 1b, turns into a reflection light 75b traveling in a given direction as designed and a reflection light 76 exiting toward the outside of an effective field of view. On the actual reflector 1b, the part 77 attributable for a reflection light 76 is referred to as an ineffective region. In case the actual reflector 1b is viewed in a direction the reflection light 75b travels (at immediately above), there is no light reaching from the ineffective region 77.

In case the ineffective region is beyond the eye's resolving power, a dark point is perceived and a lightness/darkness pattern appears on the display surface.

As noted before, the person with eyesight 1, when viewing an object at a distance of 300 mm, has a resolving power of 80 μm. Accordingly, in case the ineffective region or successive ineffective regions is made with size not more than 80 μm, the dark point is below the eye's resolving power and not visually perceived. No lightness/darkness patterns appear on the reflector.

The reflector of the invention explained above can be given by a surface-reflection type reflector having unit reflecting portions formed on the reflector, to reflect incident light upon the surface of the unit reflector parts. Meanwhile, it can be made as a back-surface-reflection type reflector which has a substrate formed of transparent glass, semi-transparent resin or the like, to reflect incident light by the unit reflector parts formed on the back surface of the substrate.

The reflector 1 of the invention is typically used as a reflector of a liquid-crystal display device. Particularly, in case at least one of a plurality of substrate sandwiching a liquid-crystal layer consists of the reflector of the invention, component can be reduced in the number and the thickness of liquid-crystal display device can be reduced.

The substrate uses a material of ceramic, glass, synthetic resin or the like. These may be transparent, semi-transparent or opaque. The substrate may be a glass plate formed with semiconductor electrodes. In this case, usually the reflector is processed by planarization at its upper surface. For forming unit reflecting portions, usually used is a resin such as acryl, polycarbonate, polyimide. Besides, polypropylene, polyurethane, polystyrene, polyimide or polyvinyl chloride can be used. The reflection surface is formed by a thin film of aluminum, silver or the like.

The unit reflecting portion of the invention may be formed in a convex form or in a concave form on the substrate. Meanwhile, the bottom surface form of unit reflecting portion can be desirably selected, i.e. circular, regular polygonal, scalene triangular, other polygonal or indeterminate form. The unit reflector parts in plurality formed on one reflector may have base surfaces in the same form or in analogous forms, or in a combination of various forms.

The unit reflecting portions may be formed, on the substrate, of a different material therefrom or formed directly on a resin film of acryl, polycarbonate. In the latter case, no substrate is required to structure the reflector 1 by a resin layer and a reflection layer.

Figure 7:
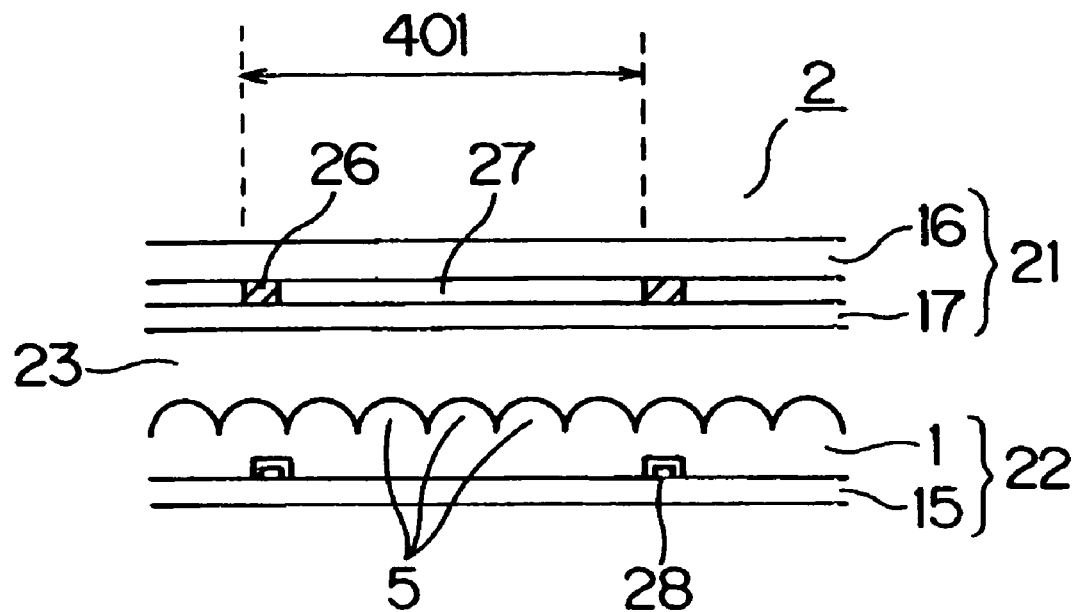
FIG. 7 is an explanatory view of a liquid-crystal display device.

FIG. 7 is an explanatory view showing the structure of the liquid-crystal display device 2 having a reflector of the invention. The lower substrate 22 is formed, on the surface of a glass substrate 15, with a thin-film transistor (TFT) 28 and gate and source lines (not shown), on which the reflector 1 is formed. The reflector 1 is a glass substrate 15 having a surface coated with a resin film and the unit reflecting portions 5 formed on a surface of the resin layer. The surface of the unit reflecting portions 5 is covered with an aluminum thin film. The glass substrate 15 and the reflector 1 are formed integral. The upper substrate 21 has the black matrix 26, color filter 27 and transparent electrode (ITO) 17 formed on the back surface of a glass substrate 16, and further a not-shown polarizing plate bonded thereon.

The liquid-crystal layer 23 is provided between the transparent electrode 17 and the reflector 1.

The line segment 401 shows the repetition pitch of pixels of the liquid-crystal display device.

The liquid-crystal display device of the invention may have an auxiliary light source besides external light. The auxiliary light source may be arranged on the main-surface side of or on the back-surface side of the liquid-crystal display device. In case the light source is disposed on the back-surface side, a part of the reflector is made to be light transmissive, and the remaining is made by a reflector of the invention.

The display device using a reflector of the invention is not limited to the liquid-crystal display device but includes a display board, an advertisement board or the like arranged with a reflector on the back surface of a light-transmissive synthetic resin plate.

Figure 8:
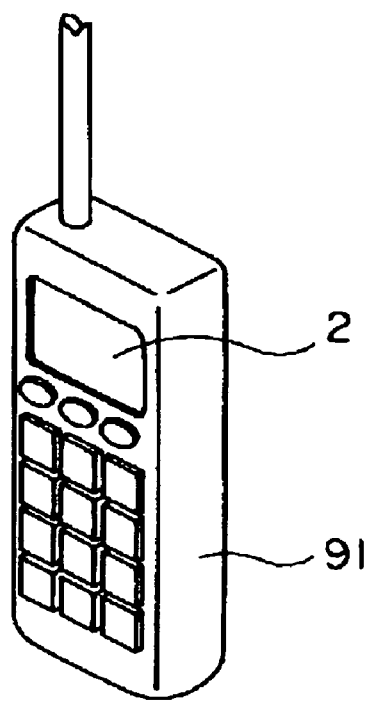
FIG. 8 is a perspective view showing an external appearance of a wireless communication apparatus.

FIG. 8 is a perspective view showing an external appearance of a wireless communication apparatus 91, such as a cellular phone or a weak-power wireless apparatus, using as a display the liquid-crystal display device 2 built with a reflector of the invention.

Figure 9:
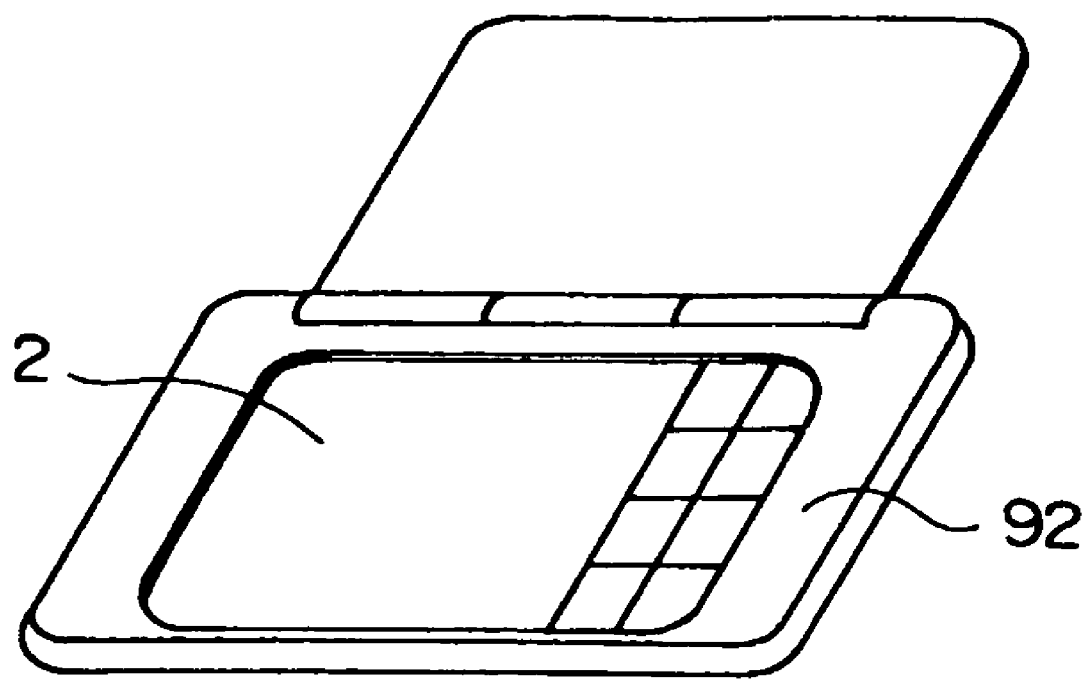
FIG. 9 is a perspective view showing an external appearance of a personal digital assistant.

FIG. 9 is a perspective view showing an external appearance of a personal digital assistant 92, such as an electronic notebook or a portable computer, using as a display the liquid-crystal display device 2 built with a reflector of the invention.

The embodiments can be applied to other electronic appliances, such as portable televisions, besides the foregoing wireless communication apparatus and the personal digital assistant.

Although several embodiments were explained, the invention is not limited to those embodiments. The scope of the invention is limited only by the claims.

What is claimed is:

1. A reflector used for a liquid-crystal display device, the reflector comprising:
   a substrate,
   a plurality of unit regions disposed on an external light facing surface or a back surface of the substrate,
   a plurality of unit reflecting portions disposed on each of the plurality of unit regions,
   the disposed plurality of unit reflecting portions being of random size within each of the plurality of unit regions,
   each of the plurality of unit regions having a common arrangement pattern of the plurality of unit reflecting portions, and
   a repetition pitch of the unit regions is integral times the pitch of pixels of the liquid-crystal display device and more than 5000 µm, wherein the unit regions are separated from each other with an at least 10-µm-wide region free of unit reflecting portions.

2. A reflector used for a liquid-crystal display device, the reflector comprising:
   a substrate,
   a plurality of unit regions disposed on an external light facing surface or a back surface of the substrate,
   a plurality of unit reflecting portions disposed on each of the plurality of unit regions,
   the disposed plurality of unit reflecting portions being of random size within each of the plurality of unit regions,
   each of the plurality of unit regions having a common arrangement pattern of the plurality of unit reflecting portions, and
   a repetition pitch of the unit regions is integral times the pitch of pixels of the liquid-crystal display device and more than 10000 µm, wherein the unit regions are separated from each other with an at least 10-µm-wide region free of unit reflecting portions.

3. The reflector according to claim 1, wherein, provided that a diameter of a circumscribed circle of positive projection of the unit reflecting portion onto the reflector is taken as a reflecting portion diameter, the reflecting portion diameter is not more than 80 µm.

4. The reflector according to claim 3, wherein the value of the standard deviation of the reflecting portion diameters divided by the mean value of the reflecting portion diameters is not more than 0.3 in the unit region.

5. A reflective display device comprising the reflector according to claim 1 for reflecting externally entering light, thereby displaying an image.

6. An electronic apparatus comprising a display including the reflective display device according to claim 5.

* * * * *